Aug. 5, 1969 C. W. FROMM 3,459,170
HEAT-CLEANING OVEN AND METHOD
Filed Dec. 30, 1964 2 Sheets-Sheet 1

INVENTOR
CHARLES W. FROMM
BY
Curtis, Morris & Safford
ATTORNEY

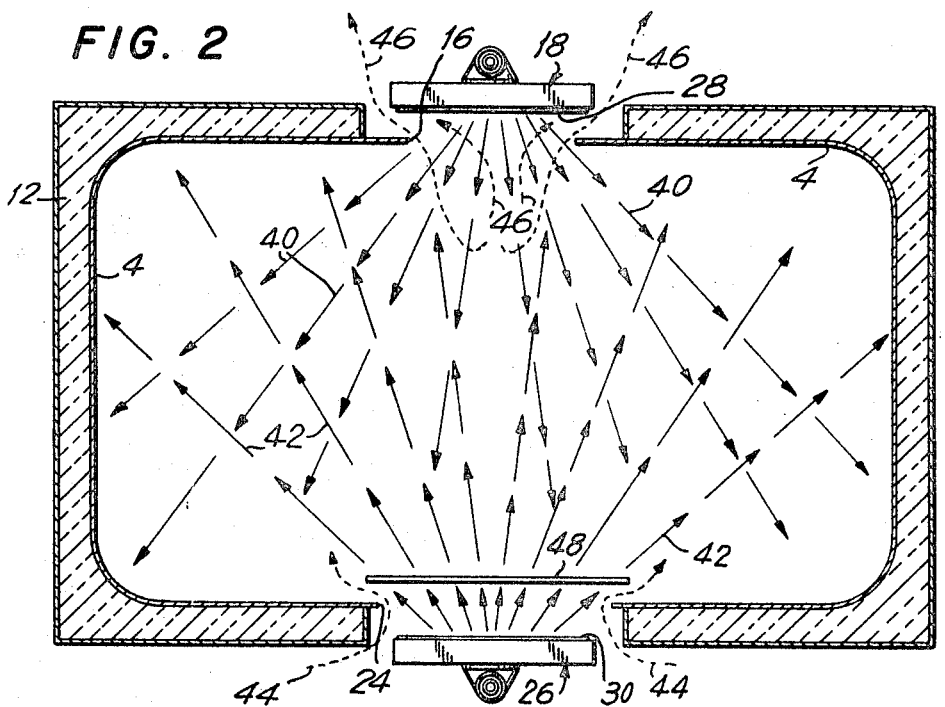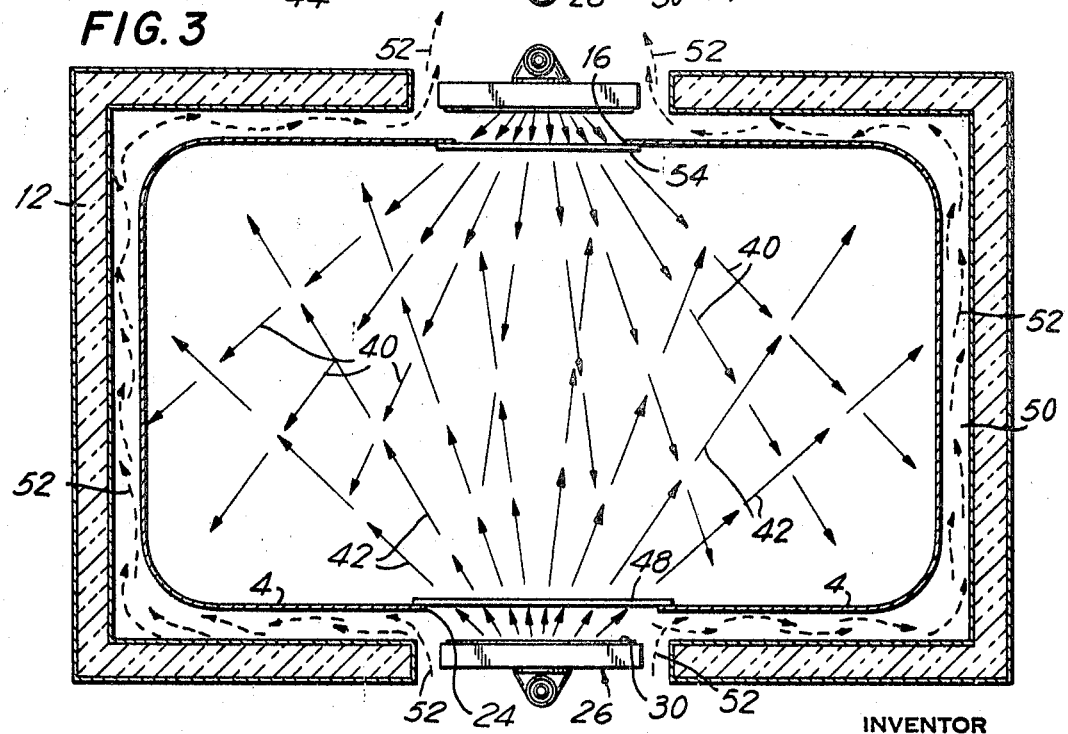

United States Patent Office 3,459,170
Patented Aug. 5, 1969

3,459,170
HEAT-CLEANING OVEN AND METHOD
Charles W. Fromm, Teaneck, N.J., assignor to Columbia
 Gas Service System Corp., New York, N.Y., a corporation of Delaware
Filed Dec. 30, 1964, Ser. No. 422,362
Int. Cl. A21b 1/00; F24c 15/32
U.S. Cl. 126—21                                                     20 Claims

ABSTRACT OF THE DISCLOSURE

Food particles and juices accumulate on the exposed surface of ovens which are used for cooking foods and form soil which adheres tightly to the surfaces. In accordance with the present invention that soil is removed by the use of infrared radiation from gas burners positioned in the oven walls. The oven walls are reflective while the soil tends to absorb the infrared radiation, particularly within the range of .8 micron to 16 microns. Hence, the soil is heated and degraded to form ash and gases without excessive heating of the oven walls.

---

This invention relates to ovens of the type which are used for baking, broiling, and other cooking of foods, and more in particular to cleaning the exposed surfaces within the cavities of such ovens by the utilization of heating means.

The inside exposed surfaces in the cavities of household and other ovens for baking, broiling, and otherwise cooking foods generally become badly soiled during use. The soil is in the form of food particles, oils, greases and juices, and the residues thereof, which remain upon the exposed surfaces as a result of, for example, grease spattering, food overflowing from pans and the like, and mishaps during use. In the past, the removal of such soil usually required a strong cleaning agent and considerable rubbing action. The cleaning operation has been an irritating household chore, and a great deal of effort has been expended in attempting to reduce the amount of soil and to facilitate the soil removal.

It is an object of the present invention to provide an improved mode of cleaning household and other ovens and the like. It is a further object to provide an improved cleaning procedure which requires no cleaning agent and avoids the objectionable manual labor, which is efficient and dependable in operation and which avoids the difficulties which have been encountered in the past. It is a further object to provide for the above with a structure which is simple, sturdy and compact, and which will operate without danger of injury to persons or damage to the equipment. These and other objects will be in part obvious and in part pointed out below.

In accordance with the present invention, infrared heaters are provided which radiate infrared heat directly onto the soiled surfaces in the cavity of the oven, and particularly directly onto the soil. There is sufficient air present to insure that the soil is degraded and converted into ash dust, which may be wiped away, and gaseous products which pass away in the air. The oven and the infrared heaters are so constructed and arranged that the exposed surfaces are thoroughly cleaned by the action of infrared radiation without an excessive elevation in the temperature of the oven. To that end there may be air circulation through the oven in excess of that required to satisfy the demand for oxygen. Alternatively or in addition, the oven may be of the muffled type, that is, the oven liner may be completely surrounded by an air chamber through which air circulates, and the air chamber is then surrounded by heat insulation.

In the drawings:

FIGURES 2 and 3 are vertical sections which are also somewhat schematic and which illustrate the embodiment of FIGURE 1 and another embodiment.

Figure 1:
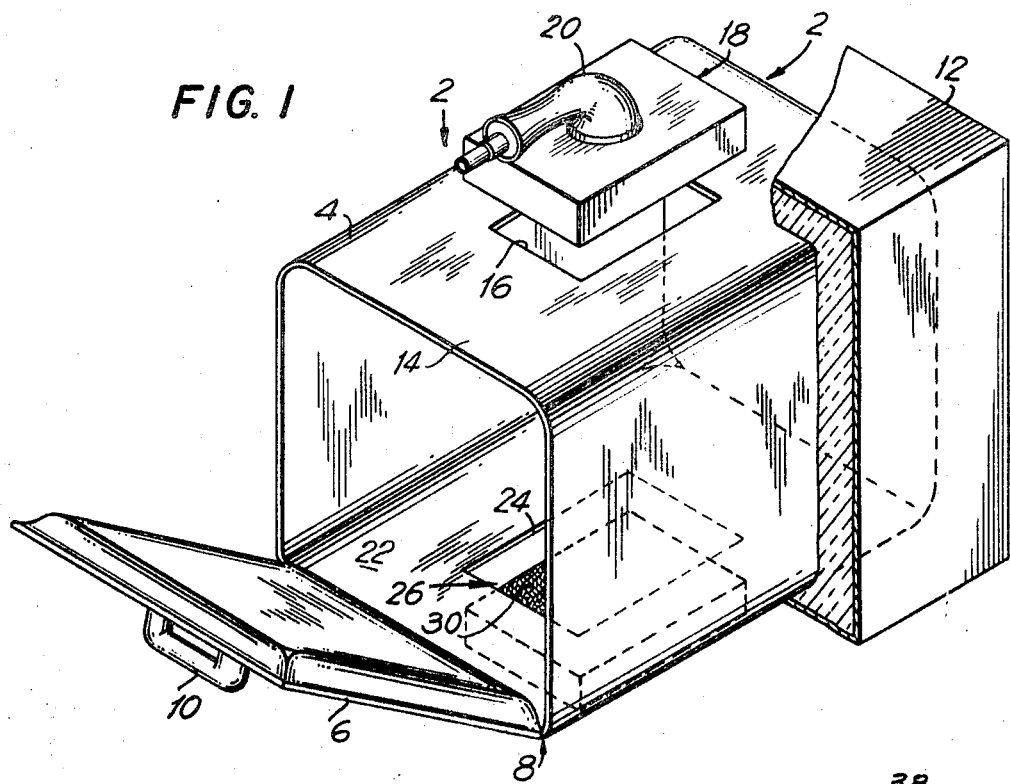
FIGURE 1 is a somewhat schematic perspective view of one embodiment of the invention.

Referring to FIGURE 1 of the drawings, a domestic or household oven 2 has an inner liner or shell 4 which has an open front and defines the oven cavity. The front of the oven is closed by a door 6 hinged at the bottom at 8 and having a handle 10. The entire liner 4 is surrounded by a liner of heat insulation 12, and door 6 has a double wall and includes insulation which is not shown. The top wall 14 of liner 4 has a rectangular opening 16 above which there is mounted an infrared gas burner unit 18 which receives a supply of air and gas through a connecting and mixing unit 20. The bottom wall 22 of the oven liner has a similar rectangular opening 24 beneath which there is a similar infrared gas burner unit 26. Burner unit 18 is used for broiling, and may also be used with burner unit 26 for baking and other cooking.

Figure 4:
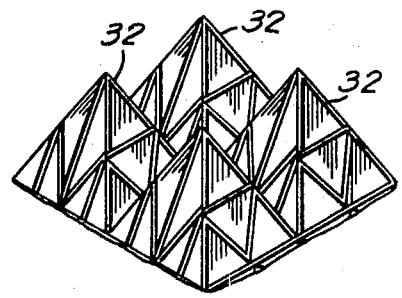
FIGURES 4 and 5 are enlarged perspective and plan views, respectively, of portions of one of the heater elements of FIGURES 1 to 3.
Figure 5:
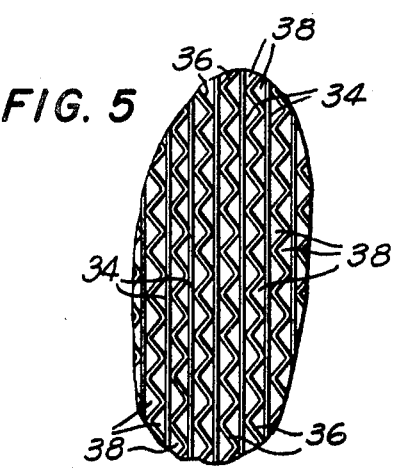

Referring to FIGURE 2, burner unit 18 has a bottom burner wall 28, and burner unit 26 has a similar top burner wall 30. Each of these burner walls is a cellular or honeycomb glass-ceramic structure, illustratively, a product of Corning Glass Works, Cercor Products Department of Corning, N.Y. The exposed face of each of these burner walls is formed into a large number of small pyramid shapes as illustrated in a greatly enlarged scale in FIGURE 4, the individual pyramid shapes being indicated at 32. The cellular or honeycomb structure is formed as shown on a smaller scale in the plan view, FIGURE 5. There are parallel spaced walls 34, and between each wall 34 and the next there is a corrugated or zig-zag wall 36, the walls being formed and fused together into an integral structure. Hence, between each wall 34, 36 and the next there is a row of open passageways 38, each of which is substantially triangular in cross-section. Each passageway 38 is vertical and provides a burner passageway from the supply of air and gas to the exposed face of the burner wall.

During operation, the entire exposed face of each of the burner walls is heated to an infrared radiating temperature. The formation of the exposed surface into a large number of pyramid shapes provides a substantial increase in the total infrared radiating surface. Furthermore, infrared radiation is at right angles from the radiating surface. Therefore, the pyramid surface formation provides dispersed and controlled radiation having a predetermined pattern. Hence, as illustrated in FIGURE 2 by the infrared radiation lines 40 and 42, the upper infrared gas burner unit 18 provides controlled infrared radiation to the entire bottom wall of the oven liner and to the bottom half of each of the side walls. Similarly, the bottom burner unit 26 provides infrared radiation to the entire top wall and the upper half of each of the side walls. For purposes of illustration, in FIGURE 2 the arrows are drawn as originating from a single point. However, throughout each pyramid portion of each of the burner walls 28 and 30, there is infrared radiation somewhat in the shape of an inverted pyramid. The resultant radiation pattern is, therefore, quite uniform even if an area of the burner is blocked off or is otherwise inoperative.

As indicated above, the oven-cleaning operation which is performed by the infrared radiation degrades the soil so as to produce gases and ash. This process requires the presence of a satisfactory quantity of oxygen throughout the areas of the soil. Accordingly, in FIGURE 2 the products of combustion from unit 26 and additional air represented by the broken line arrows 44 enter the opening 24 in the bottom wall of the oven. The air and gases flow out of the top of the oven through opening 16 as represented by the broken line arrows 46. The air and gases passing from the oven flow in close proximity to the bottom face of burner unit 18 so that the gases are subjected to intense infrared radiation. Therefore, any remaining vapors or soil particles in the air are degraded with the result that the discharged gases and air do not produce objectionable odors or deposits where they are discharged.

In this embodiment the radiating area or surface of burner unit 18 is larger than opening 16 so as to insure against the discharging of gases or food particles which have not been completely degraded. In the embodiment of FIGURES 1 and 2, positioned over opening 24 at a level slightly above the bottom wall of the oven is a hearth plate 48 which is used during the cooking operation and provides protection for unit 26. While this plate may be metal, in this embodiment it is translucent and transmits a very high percentage of the infrared radiation. The invention contemplates that plate 48 may be removed during the oven-cleaning operation, as shown in FIGURE 1.

In the embodiment of FIGURES 1 and 2, the air circulation is sufficient to maintain the temperature within acceptable limits throughout the oven. The oven liner or shell 4 has a highly reflective inner surface so that the infrared radiation is reflected from it and produces only the desired heating of the inner liner. At the same time, each particle of soil on the exposed surfaces in the oven cavity is subjected to intense infrared radiation. The residues of juices, greases, oils, and food particles tend to become charred and dark so that they have relatively high infrared absorption rates. Also, the oils and greases which occur in foods are relatively high in the characteristic of absorbing infrared rays, even prior to discoloration by heat. Hence, the infrared radiation tends to heat each particle of soil to a temperature where it is degraded, while the oven walls tend to remain at lower temperatures. The soil has wide ranges of characteristics depending upon many different factors, for example, the specific food, and the cause of the soil, by spilling or splattering, or by a container boiling over. In each instance, the infrared radiation tends to be concentrated and absorbed by the soil in preference to the highly reflective inner surface of the oven liner. As a result, the soil is degraded and converted into gaseous products and residue ash predominantly by self-ignition, that term being understood to mean the degrading and converting action as herein disclosed. The reflection of infrared radiation tends to insure that all of the oven walls and oven components within the oven are heat-cleaned.

The embodiment of FIGURE 3 is very similar to that of FIGURES 1 and 2, except that it is a muffle type of oven with he oven liner 4 being surrounded by an air flue passageway 50 through which there is a constant circulation of air and the products of combustion from burner unit 26. In FIGURE 3, the hearth plate 48 is positioned to close the opening 24, and a similar plate 54 closes the opening 16, and both plates are in place during baking and some other cooking operations, but they are translucent so that they transmit a very high percentage of the infrared radiation. Plate 54 is removed during broiling operations, and both plates are removed during heat-cleaning of the oven. The air circulation when plates 48 and 54 are in place is represented by the broken line arrows 52, and the infrared radiation is represented by the arrows 40 and 42 as in FIGURE 2.

In the schematic representation of FIGURE 3 the support structure for the inner liner 4 is not shown. However, it provides rigid support for liner 4 and does not interfere with the free circulation of air through the flue gas passageway 50. Openings 16 and 24 permit sufficient air circulation throughout the oven cavity to provide adequate oxygen for the heat-cleaning operation, and the degradation gases pass away with the air as in the embodiment of FIGURES 1 to 3.

When the heat-cleaning operation has been completed with the illustrative embodiments, there may be ash upon the surfaces which have been cleaned, but this will appear in the form of dust films which can be wiped away. In both embodiments, the burner units 18 and 26 are used to perform the various food cooking operations in the same manner as gas burner units are used in other similar ovens. Standard controls are provided for use during the cooking and heat-cleaning operations. Under some circumstances it may be desirable to provide auxiliary gas burner units. The invention contemplates that the oven door 6 will be closed during the heat-cleaning operation. Also, a timer may be provided which will discontinue the heat-cleaning operation automatically after a predetermined time.

The present invention contemplates that the heat-cleaning operation will be carried on with infrared radiation within the range of the order of .8 micron to 10 microns. The upper limit of this range may be extended, for example, to 16 microns when desirable. The units 18 and 26 produce infrared radiation of a relatively wide range which is broad enough to include a portion of the range of the major absorption wave lengths of each of the various food fats and other food products. Hence, these units are admirably suited to accomplish infrared heat-cleaning in an efficient and dependable manner.

In each of the above-described illustrative embodiments, the infrared heater unit 18 at the top of the oven acts as a scavenger or incinerator unit. The functioning of the unit for this purpose is insured by providing an opening 16 which is smaller in each direction than the radiation surface. The utilization of this heater unit for this additional function makes it unnecessary to provide an incinerator unit separate from the heat source. There are additional advantages of this double use of unit 18 in that it will destroy smoke and odors whenever it is being used during a cooking operation. Also, when a separate incinerator unit is provided in an oven, it may become completely inoperative, and the operator may not become aware of that.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

What is claimed is:

1. In the art of cleaning the exposed surfaces within the cavity of the inner shell of an oven which is used for cooking food and said exposed surfaces tend to become soiled by food juice and fat residues and particles of the food, the steps of, subjecting said exposed surfaces predominately to the direct action of infrared radiation, and supplying air in proximity to said exposed surfaces to provide sufficient oxygen to insure that the soil adhering to said exposed surfaces is degraded and converted into gaseous products and residue ash predominately by self ignition resulting from absorption of the infrared radiation.

2. The method as described in claim 1 wherein infrared radiation is produced within two zones located substantially at opposite sides of the oven cavity.

3. The method as described in claim 1 wherein said infrared radiation is produced by a gas-fired burner having a burner portion with exposed radiation surfaces which are not in a single plane, whereby there is a controlled directional characteristic to the infrared radiation.

4. The method as described in claim 1 which includes circulating air upwardly through the oven, and exhausting it along a path which exposes the exhaust air and gases to intense and direct infrared radiation.

5. The method as described in claim 1 wherein the external surfaces of the oven shell are maintained at a temperature which is below the maximum temperature to which the soil is elevated.

6. The method as described in claim 1 wherein the infrared radiation is of wave lengths substantially within the range of .8 micron to 16 microns.

7. In an oven which has an inner shell and which is used for cooking food and which has exposed surfaces which tend to become soiled by food juice and fat residues and particles of the food, radiation means for subjecting said exposed surfaces predominately to the direct action of infrared radiation, and means to provide for supplying air in proximity to said exposed surfaces to insure that there is sufficient oxygen present so that the soil adhering to said exposed surfaces is degraded and converted into ash residue gaseous products and by self ignition resulting from absorption of the infrared radiation.

8. The apparatus described in claim 7 wherein the radiation means is in the form of two units located substantially at opposite walls of the oven.

9. The apparatus described in claim 8 wherein said inner shell has top and bottom walls each of which has an opening, and said units are positioned respectively at said openings.

10. The apparatus described in claim 7 wherein said radiation means is a gas-fired burner having a burner portion with exposed radiation surfaces which are not in a single plane, whereby there is a controlled directional characteristic to the infrared radiation.

11. The apparatus described in claim 9 wherein said exposed radiation surface is formed by a plurality of cellular type pyramid portions.

12. The apparatus described in claim 7 which includes means for circulating air upwardly through the oven, and means for exhausting air and gases along a path which exposes the exhaust air and gases to intense and direct infrared radiation.

13. The apparatus described in claim 7 wherein said radiation means is covered by a plate.

14. The apparatus described in claim 7 which includes means providing a path along which air and gases are exhausted from said inner shell, and wherein said radiation means includes unit positioned along said path to subject the exhaust air and gases to intense and direct infrared radiation.

15. The apparatus described in claim 14 wherein said unit is a gas-fired burner.

16. The apparatus described in claim 7 wherein the oven is of the muffled type.

17. In the art of cleaning the exposed surfaces in the cavity in the inner shell of an oven, the steps of, subjecting said exposed surfaces and the soil predominately to infrared radiation to produce a desired elevation in the temperature of the surfaces of the soil for a period sufficient to degrade the soil adhering to said exposed surfaces to produce ash and oxidation gases predominately by self ignition resulting from absorption of the infrared radiation and controlling the heating to prevent an excessive temperature of the oven walls.

18. The art defined in claim 17 wherein the degrading of the soil is produced by infrared radiation substantially within the range of .8 micron to 10 microns.

19. In the art of cleaning the exposed surfaces in the cavity in the inner shell of an oven, the steps of, operating a gas-fired burner of the infrared radiation type to produce controlled infrared radiation substantially within the range of .8 micron to 10 microns with the burner being positioned so that the soil is subjected predominately to the direct infrared radiation from the burner surfaces and with the intensity of the infrared radiation being sufficient to heat the soil above the temperature of the inner shell of the oven thereby to degrade the soil predominately by self ignition resulting from absorption of the infrared radiation, and controlling the heating to prevent an excessive temperature of the oven walls.

20. In an oven construction of the type which is used for cooking foods and which has exposed surfaces which tend to become soiled, the combination of, an oven shell having a door opening, a door mounted to close said opening, and an infrared-radiation gas-fired burner having its infrared radiating surfaces positioned to direct infrared radiation to soil at exposed surfaces within said shell with the radiation being substantially within the range of .8 micron to 10 microns and of an intensity to heat the soil to a temperature where it is degraded and converted into ash and gaseous products predominately by self ignition resulting from absorption of the infrared radiation.

References Cited

UNITED STATES PATENTS

| | | | |
|---|---|---|---|
| 3,121,158 | 2/1964 | Hurko | 126—273 X |
| 3,155,814 | 11/1964 | Appleman et al. | 126—273 X |
| 3,170,504 | 2/1965 | Lanning | 158—116 |
| 3,267,924 | 8/1966 | Payne | 126—41 |

FREDERICK L. MATTESON, JR., Primary Examiner

EDWARD G. FAVORS, Assistant Examiner